United States Patent Office 3,206,120
Patented Sept. 14, 1965

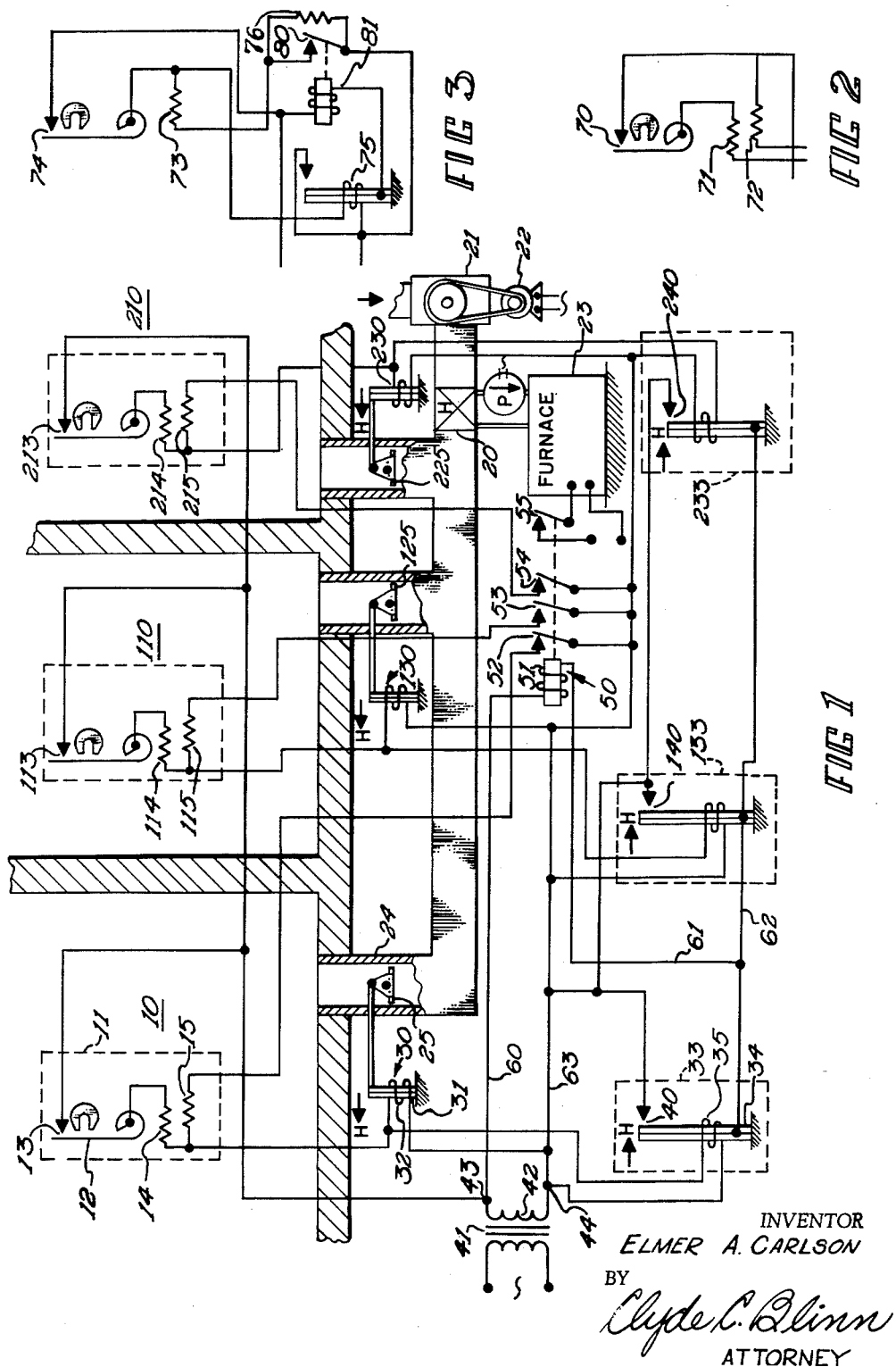

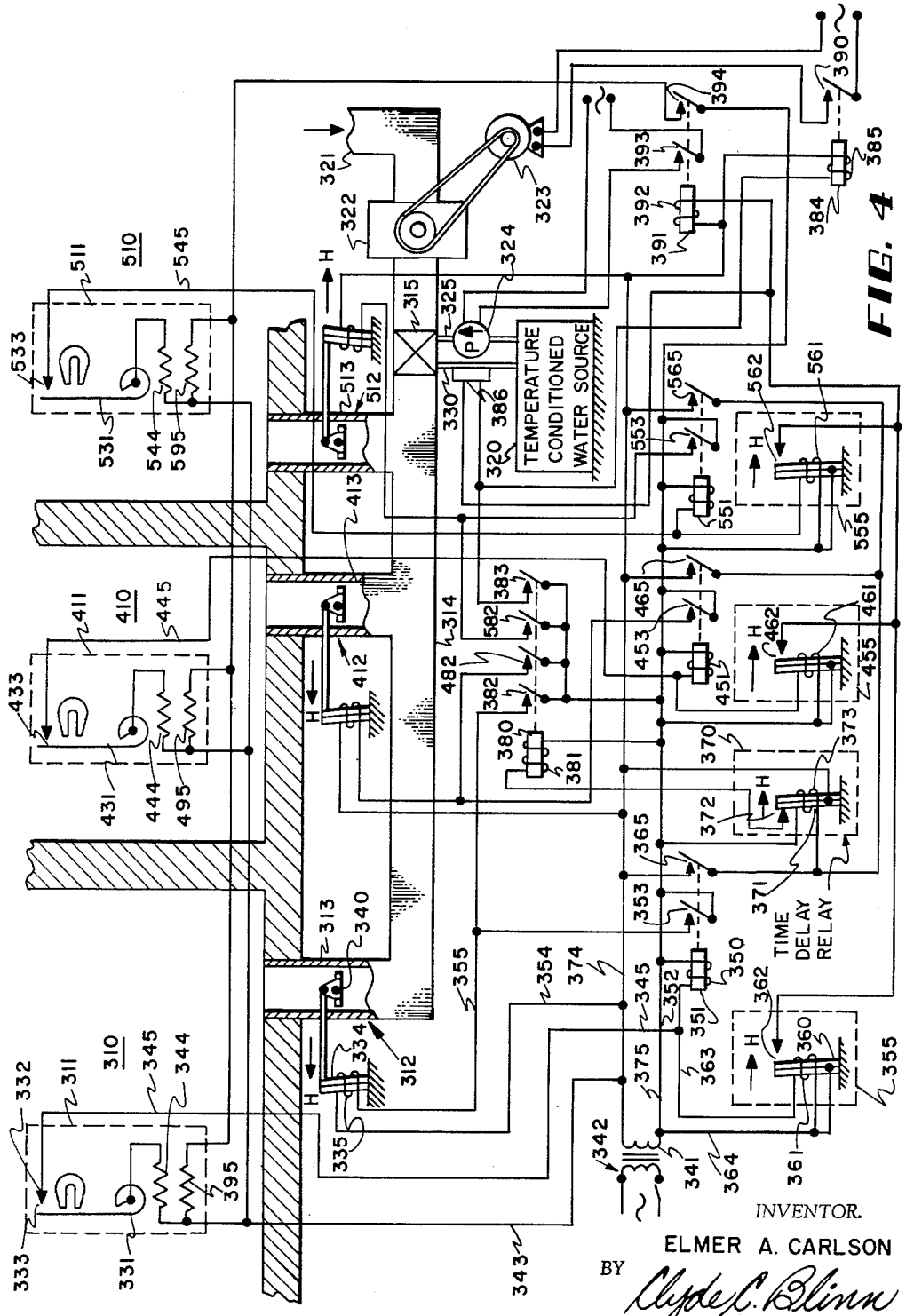

3,206,120
ZONE TEMPERATURE CONTROL APPARATUS
WITH SHIFTING AUTHORITY
Elmer A. Carlson, Richfield, Minn., assignor to Honeywell
Inc., Minneapolis, Minn., a corporation of Delaware
Filed June 1, 1964, Ser. No. 371,854
17 Claims. (Cl. 236—68)

The present application is a continuation-in-part application of the now abandoned application by Elmer A. Carlson, Serial Number 225,646, filed September 24, 1962, for a Zone Temperature Control Apparatus With Shifting Authority.

The present invention is concerned with an improved zone temperature control system; in particular, the system has a plurality of zone thermostats which control zone damper actuators and zone integrating relays in accordance with the heating load of each zone. A thermal means is associated with each thermostat whereby upon the operation of one of the integrating relays to initiate the operation of the temperature changing apparatus, the control points of the zone thermostats are modified.

In systems having a primarily responsive means for controlling an integrating device, a considerable amount of lag has been inherent in such systems. In air conditioning systems such lag results in a wandering or overshooting of the selected control temperature. Instability of the system is especially inherent in zone systems.

The present invention is concerned with a feedback from the main furnace control to each of the thermostats. Specifically, the zone or space thermostats of the present invention are artifically heated in addition to the normal heat anticipation to change the control point of the thermostat whenever the furnace or temperature conditioning apparatus is energized. In this manner, upon a call for heat in a zone or space having the greatest heating load, the thermostat is effective to initiate the operation of the furnace and the thermostats in the remaining zones are artificially heated to reduce the effective of the other thermostats on the control of the furnace. The feedback signal to the zone thermostats accomplishes two purposes. By lowering the control point of the thermostats, the feedback tends to keep the thermostat of the zone having the greatest heating load in control of the furnace, but more important, the feedback to the space thermostats anticipates the effect of the energization of the furnace on the space temperature to maintain a more stable temperature control.

Another embodiment of the present invention is to provide a means to provide a maximum flow of air to all zones a predetermined time after all thermostats are satisfied.

An object of the present invention is to provide a temperature control system having a plurality of space thermostats for controlling a temperature conditioning means with a direct feedback to the thermostats upon an operation of the conditioning means.

Another object of the present invention is to provide for maximum air flow to all of the zones when the zone thermostats are satisfied and the conditioning apparatus is not operating by opening the flow control means to each zone after a predetermined time delay.

Another object of the present invention is to provide an improved zone temperature control system wherein the zone thermostats are affected to control a temperature changing apparatus with a means for changing the control point of the zone thermostats when the temperature changing apparatus is energized.

A still further object of the present invention is to provide in a system having a thermostat controlling an integrating relay means wherein a feedback signal to the thermostat stabilizes the system.

Another object of the present invention is to provide for maximum ventilation in a zone temperature control system by opening the flow control means to each zone after all of the zone thermostats have been satisfied for a predetermined period of time.

These and other objects of the present invention will become apparent upon a study of the following specification and drawing of which FIGURE 1 is a schematic representation of a typical zone or space temperature control system having a plurality of zones which are supplied with temperature condition mediums from a single source and means are provided for changing the control point of the thermostats in each of the spaces upon the energization of the temperature changing apparatus;

FIGURE 2 is another embodiment of the specific means for modifying the temperature control point of the space thermostat;

FIGURE 3 is another embodiment of a specific means for modifying the temperature control point of the space thermostat; and FIGURE 4 is a schematic representation of a typical zone or space temperature control system having a plurality of zones which are supplied with a temperature conditioned air from a single source with means for providing for maximum air flow after the zone thermostats have been satisfied for a predetermined period of time.

*Description of FIGURES 1, 2 and 3*

Referring to FIGURE 1, a zone or space temperature control system is shown for controlling the temperature in a plurality of zones 10, 110, and 210. For explanation purposes, the numbers applied to the various components in each of the zones which are similar to those of other zones will be given numbers which distinguish from each other, depending upon the zone, by 100. Referring to zone 10, a zone temperature responsive device or conventional thermostat 11 has a bimetal 12 for controlling the operation of a snap acting switch 13 depending upon the temperature of the bimetal. A heater resistance winding 14 provides conventional "heat anticipation" to the thermostat by cycling the operation of switch 13 in a predetermined manner depending upon the heating load experienced by the thermostat in the space. A second heater winding 15 supplies additional heat to the thermostat as will be explained in more detail later in the specification.

Conditioned or heated medium or air is supplied from a heat exchanger 20 through a plurality of ducts or conduits connected to each zone. Air is forced through heat exchanger 20 by a fan 21 driven by a constant speed motor 22. Heat exchanger 20 is heated by a conventional temperature changing device or furnace 23 which is connected to supply hot water to heat exchanger 20 through a pump such as disclosed in the Stavnes et al. Patent 2,801,826. While one specific means of supplying temperature conditioned medium or air to the plurality of zones is shown, the invention is not to be limited in any manner to the specific details of the heating system. In conduit 24 which supplies heated air to zone 10, a damper or flow control means 25 is mounted and is controlled by a damper actuator 30. Damper actuator 30 is of a thermal type having a bimetal 31 which is heated by a winding 32 to move the bimetal to the left to open damper 25.

Associated with zone 10 is a thermal switch actuator or "slave" unit 33 which comprises a bimetal 34 heated by a winding 35 to move the bimetal to the right to close a switch 40. "Slave" unit 33 is of the integrating type to provide a closed time of switch 40 depending upon the percentage of total time of energization of heater 35.

A source of power 41 comprises a step-down transformer connected to an A.C. source with a secondary winding 42. The damper actuator and "slave" unit of zone 10 is connected to be controlled by thermostat 11 in the following manner. An upper terminal 43 of secondary 42 is connected through switch 13, heater 14, winding 30 and back to the lower terminal 44 of the secondary winding. Winding 32 is connected in parallel with winding 35. Upon the closing of switch 13, damper actuator 30 and the "slave" unit 33 are energized, and by the operation of the anticipation heater 14, thermostat 11 provides a cycling operation of switch 13 depending upon the heating load experienced in space 10. When the cycles of operation of switch 13 are sufficient to provide a predetermined energization time of the "slave" unit 33, switch 40 is closed. The percentage of on time of thermostat 11 determines the position of damper 25 as actuator 30 will move the damper toward an open position depending upon the total heat delivered to bimetal 31 by the energization of heater 32.

The other two zones 110 and 210 have similar damper actuators 130 and 230 and "slave" units 133 and 233. These damper actuators and "slave" units are connected to the respective zone thermostats in a similar manner to provide the same type of operation for each of the zones.

A relay 50 has an energization winding 51 and a plurality of switches 52 and 55 which are closed upon the energization of the relay. Switch 55 is connected to control the operation of furnace 23; so that upon the energization of relay 50, heat is supplied to heat exchanger 20.

Switches 40, 140, and 240 are connected in parallel to provide a circuit for connecting secondary 42 to energize relay 50 by a circuit traced as follows: from terminal 43, a conductor 60, winding 51, a conductor 61, a conductor 62 which is connected to each of the switches 40, 140 and 240, and back to lower terminal 44 of secondary 42 through a conductor 63. When any one of the "slave" unit switches is closed, relay 50 is energized to energize the temperature changing means for increasing the temperature of the air supplied to each of the zones. Switches 52, 53, and 54 are connected to connect the additional heaters 15, 115, and 215 to secondary 42 whereby upon the energization of relay 50, the additional heat is supplied to each of the zone thermostats to change the control point of the thermostat.

Referring to FIGURE 2, another embodiment of the connection arrangement for the space thermostat is shown. Thermostat switch 70 has a conventional heat anticipation heater 71 connected in series with switch 70 to be energized each time the thermostat calls for a change in the space temperature. A second heater 72 which is used as the feedback heater and is energized when the furnace is energized is connected separate from the thermostat switch 70. As will be explained later, when the embodiment of FIGURE 2 is connected in the zone system, the feedback heater 72 is not de-energized when the thermostat becomes satisfield to open switch 70.

Referring to FIGURE 3, an arrangement for providing a voltage heat anticipation heater 73 with a space thermostat is shown. The thermostat switch 74 is connected to control the energization winding for an integrating relay 75. Upon the energization of the integrating relay by closing thermostat switch 74, a voltage path is provided through switch 74 to energize heat anticipation heater 73. By means of series resistance 76, which is connected in parallel with switch 80 on the main load control relay 81, the level of heat supplied by heater 73 can be changed by shorting out the resistance 76. In other words, the circuit of FIGURE 3 makes use of one heater 73 for the normal heat anticipation as well as the feedback heat which was described in connection with the zone system of FIGURE 1.

Operation of FIGURES 1, 2 and 3

Referring to the system of FIGURE 1, with all of the zones satisfied and the thermostat switches open, the zone dampers 25, 125, and 225 are closed and the integrating relays 33, 133, and 233 are open to de-energize the furnace. Upon a call for heat by thermostat 11 in zone 10, switch 13 is closed to energize the windings 32 and 35. As "heat anticipation" heater 14 is energized, the thermostat will tend to cycle in a conventional manner depending upon a deviation of the space temperature from the control temperature or set point. When the close time of switch 13 is great enough to increase the temperature of "slave" unit 33 to close switch 40, relay 50 is energized and furnace 23 begins to supply heat to the air being delivered to zone 10. The position of damper 25 is established by the temperature of actuator 30. In other words, the position of the damper depends upon the on time of thermostat 11. Immediately upon the energization of relay 50, switch 52 is closed to energize feedback heater 15 of thermostat 11. The feedback heater provides a signal to anticipate the increase in air temperature to the space to reduce the damper opening position and at the same time reduce the temperature of integrating relay 33 in anticipation of a satisfaction of the zone temperature in space 10. With such a feedback system, the stability of the system is greatly increased. With the energization of relay 50, the feedback heat is also supplied to thermostats 111 and 211.

Assuming that the other zones also needed heat, the zone thermostats would close in a similar manner to energize the damper actuators as well as the integrating relays. The feedback signal to each of the thermostats 111 and 211 as provided by the heaters 115 and 215 will provide the same result as mentioned in connection with thermostat 11.

When any one of the zones is calling for heat such as zone 10 and thermostat switch 13 closes, both of the heaters 14 and 15 are energized through the circuit including switch 13. By this system connection, when the feedback heater 15 is energized through switch 52, the heat to reduce the control point of thermostat 11 is only supplied as long as the thermostat is closed. As soon as the thermostat becomes satisfied, both the normal "heat anticipation" heat and the feedback heat are terminated.

Under certain conditions, a more stable system is provided when the feedback heater 72 is connected as shown in FIGURE 2. In this circuit, the feedback heater is energized by the switch of relay 50 and is not connected to be adjusted by the operation of switch 70 or the zone thermostats. With a zone system having the zone thermostat connected as shown in FIGURE 2, a constant heat for feedback purposes is provided as long as the furnace relay is energized.

The system of FIGURE 3 makes use of a single heater for both the heat anticipation and the feedback arrangement. In certain systems, such a circuit arrangement is more desirable. The normal "heat anticipation" heat is provided when switch 74 closes through the circuit including both the "heat anticipation" resistor and the resistor 75 which can be shunted by switch 80 on a control relay 81. When the control relay is energized to close switch 80, the heat level of anticipation heater 73 is increased by taking the resistance 75 out of the circuit. In this circuit, the feedback heat and the normal heat anticipation heat is primarily under the control of thermostat switch 74.

Description of FIGURE 4

Referring to FIGURE 4, a zone or space temperature control system is shown for controlling the temperature in a plurality of zones 310, 410 and 510. To simplify the explanation the numbers applied to the various components in each of the zones which are similar will be given numbers which distinguish from each other depending upon the zone by 100. Each of the zones has a temperature responsive device or zone thermostat 311 which controls the operation of a flow control device 312 to control the supply of conditioned medium or air to the zone through a branch conduit or duct 313. Connected to each of the branch ducts 313, 413, and 513 is a main duct 314 which contains a heat exchanger or coil 315 to which conditioned medium or hot water is supplied from a temperature conditioning or conditioned water source 320. Air returns from each of the zones through a return duct 321 under the power of a fan 322 which is driven by a fan motor 323. The supply of hot water to coil 315 from source 320 is under the control of a circulating pump 324 which when energized supplies the hot water through a supply pipe 325 and back to the source through a return pipe 330.

Thermostat 311 has a bimetal 331 which engages contact 332 to close a switch 333 upon a change in the temperature of space 310. When switch 333 of thermostat 311 closes, a motor or actuator comprising a bimetal 334 which is heated by a winding 335 is moved to the left to open damper 340. Thermostat 311 is connected to winding 335 by a circuit traced as follows: from a secondary winding 341 of a source of power or stepdown transformer 342, a conductor 343, a heat anticipation heater or resistance element 344 in thermostat 311, bimetal 331, switch 333, contact 332, a conductor 345, an energization winding 350 of a relay 351, and back to the secondary winding through a conductor 352. Relay 351 has a first normally open switch 353 which when closed upon the relay being energized completes a circuit to energize winding 335 as follows: from secondary winding 341, a conductor 354, winding 335, a conductor 355, switch 353, and back to the other side of the secondary 341.

Thermostat 311 also controls the operation of a slow operating switch device 355 which has a bimetal 360 heated by a winding 361 to close a switch 362 after a predetermined period of energization. Device 355 is energized when thermostat 311 closes switch 333 by a circuit traced as follows: from secondary 341, conductor 343, thermostat 333, conductor 345, conductor 363, winding 361, conductor 364 and back to the other side of the secondary winding.

Relay 350 has a second normally open switch 365 which is closed when relay 351 is energized to energize a time delay switch device or relay 370 which has a bimetal 371 for opening a switch 372 when the bimetal is heated upon the energization of a winding 373. Winding 373 is energized when switch 365 closes through a circuit traced as follows: from secondary 341, conductor 374, switch 365, heater winding 373, and back to the other side of the secondary through conductor 375.

Time delay relay 370 controls the operation of relay 380 by energizing winding 381 when switch 372 is closed by connecting winding 381 to secondary winding 341. Relay 380 has a first normally open switch 382 which when closed upon energization of relay 380 can independently energize winding 335, to open the flow control device or damper 340 of zone 311 by connecting the flow control apparatus to secondary winding 341 as switch 382 is connected in parallel with switch 353 which normally provides the energization circuit for the damper actuator. Normally open switch 482 and 582 of relay 350 are connected in a similar manner to the damper actuators of zones 410 and 510.

A fourth normally open switch 383 is closed when relay 380 is energized to bring about constant operation of the fan motor 323 by energizing relay 384. Winding 385 of relay 384 is energized by connecting winding 385 through switch 383 to conductors 374 and 375 across the secondary winding 341. When relay 384 is energized switch 390 closes to connect motor 323 to a source of power. A relay 391 which has an energization winding 392 has a normally open switch 393 which controls the operation of pump 324 by connecting the pump to a source of power. Winding 392 is connected across the secondary winding 341 when any one of the switches 362, 462 or 562 which are connected in parallel closes. Winding 385 is similarly energized through a temperature controller 386 which responds to the temperature of the water in pipe 330 or the temperature of coil 315 when relay 391 is energized whereby fan 322 provides for movement of air when hot water is supplied to coil 315 by the energization of pump 324.

Switch 394 of relay 391 connects feedback means or heater 395, 495 and 595 in the thermostats of each zone to the secondary winding 341.

Operation of FIGURE 4

In the system of FIGURE 4, the control of the flow control means of each zone and the control of the heat source for supplying conditioned air to each zone is substantially the same as the system shown in FIGURE 1.

When any one of the thermostats calls for the need of conditioned air in the space, the thermostat closes. For example, in zone 310 upon a need for heat, switch 333 closes to energize heater 361. After a predetermined time bimetal 360 moves to the right to close switch 362. At the same time that heater 361 is energized, thermostat 311 causes energization of relay 351. Switch 353 of relay 351 energizes winding 335 to drive damper 340 toward the open position. Switch 362 controls the energization of relay 391 which brings about the operation of pump 324 and fan 322 to supply conditioned air through duct 314 to the branch or zone which in this particular case is zone 310. When switch 365 closes, winding 373 is energized and after a predetermined time, switch 372 opens to de-energize relay 380. Normally with relay 380 energized, the zone damper actuators are energized to maintain the zone dampers 340, 440 and 540 in an open position and to maintain the fan in operation by energizing relay 384 through a switch 383. When switch 372 opens, the dampers are allowed to move toward the closed position so the normal control of the dampers, pump 324 and fan 322 is brought about.

Similar to the system of FIGURE 1, a feedback is provided to each of the zone thermostats when any one of the thermostats calls for a need for conditioned air to the zones. The feedback is accomplished when relay 391 is energized to operate the air conditioning source by closing switch 394 to energized heaters 395, 495 and 595 of the thermostats.

When all of the zone thermostats become satisfied, and the slow operating relays 355, 455 and 555 are allowed to cool down, the respective relays 351, 451, and 551 will de-energize and any possible energization circuit for heater 373 is opened. After a predetermined time depending upon the time needed to cool bimetal 371, the time delay relay 370 closes the circuit through switch 372 to energize relay 380. Relay 380 causes all of the damper actuators to drive the dampers to a wide open position and energize the fan so that maximum air flow to all of the zones for ventilation is provided as long as none of the zone thermostats are calling for heat and the temperature conditioning source or coil 315 is not being supplied with temperature conditioned water. By means of the time delay relay 370, the operation of the damper actuators to open the dampers to a wide open position when all of the zones are satisfied prevents the supply of heated medium to the other zones as the heat from coil 315 is allowed to be delivered to the zone which last calls for heat before the other zone dampers are opened.

While the present invention has been described as applied to one particular type of heating system, the intention is to limit the scope of the present invention only by the appended claims.

I claim:
1. In a zone temperature control system,
an air conditioning apparatus, means providing a plurality of zones,
a plurality of ducts connecting said apparatus to the zones,
flow control means mounted in each duct leading to each zone,
actuator means connected for controlling the position of each of said flow control means,
a heat operated switch means for each zone, said switch means being heated upon the energization of an electric heater associated therewith,
a thermostat in each zone,
a heat anticipation heater mounted in said thermostat for causing said thermostats to cycle as the zone temperature deviates from a predetermined temperature,
a source of power,
circuit means for each zone connecting said source to energize said actuator and said electric heater of said switch means upon a need for conditioned air by said thermostat, said thermostat having a circuit closed position proportional to a conditioning load of said zone,
relay means adapted to control the energization of said conditioning apparatus,
circuit means connecting said switch means of each zone in parallel to control the energization of said relay means from said source,
a second electric heater mounted in each of said thermostats, and
means including said relay means for connecting each of said second heaters to said source to artificially heat said thermostats when said conditioning apparatus is operating to change the control temperature of said thermostats to deviate farther from said predetermined temperature.

2. In a zone temperature control system,
means providing a plurality of zones,
an air conditioning apparatus wherein conditioned air is supplied to said plurality of zones through ducts,
damper means mounted in each duct leading to each zone,
actuator means connected for controlling the position of each of said damper means,
a bimetal operated switch means for each zone, said bimetal having a first electric heater associated therewith to heat said bimetal to close said switch means,
temperature responsive switch means in each zone having a normal heat anticipation electric heater and a second electric heater thermally associated therewith,
a source of power,
circuit means for each zone including said temperature responsive switch means connecting said source to energize said actuator and said first electric heater of said zone upon a need for conditioned air in the space,
relay means adapted to control the energization of said conditioning apparatus, circuit means connecting said bimetal operated switch means of each zone in parallel to control the energization of said relay means from said source, and
means including said relay means connecting each of said second heaters to said source to artificially heat said temperature responsive means when said conditioning apparatus is operating.

3. In a zone temperature control system,
an air conditioning apparatus,
means providing a plurality of zones,
a plurality of ducts connecting said apparatus to said plurality of zones,
damper means mounted in each of said ducts leading to each zone,
actuator means connected for controlling the position of each of said damper means,
a bimetal operated switch means for each zone, said bimetal having an electric heater associated therewith to heat said bimetal to close said switch means,
temperature responsive switch means in each zone having a normal heat anticipation electric heater thermally associated therewith,
a source of power,
circuit means for each zone including said temperature responsive switch means connecting said source to energize said actuator means and said electric heater of said zone upon a need for conditioned air in the space,
relay means adapted to control the energization of said conditioning apparatus,
circuit means connecting said bimetal operated switch means of each zone in parallel to control the energization of said relay means from said source,
feedback means mounted in each of said temperature responsive switch means, and
means including said relay means for connecting each of said feedback means to said source to modify said temperature responsive means when the conditioning apparatus is energized.

4. In a temperature control system wherein conditioned air is supplied to a plurality of spaces through conduits connected to an air conditioning apparatus,
flow control means mounted in the conduit leading to each space,
slow operating switch means for each space, temperature responsive switch means in each space,
a source of power,
circuit means for each space connecting said source to energize said flow control means and said slow operating switch means of one of said spaces upon a need for conditioned air determined by said temperature responsive switch means of each space,
circuit means connecting said slow operating switch means of each zone in parallel to control the energization of said conditioning apparatus from said source, and
means actuated upon the energization of said conditioning means to change the control temperature of each of said temperature responsive means.

5. In a zone temperature control system, a medium conditioning apparatus, means providing a plurality of zones, a plurality of ducts connecting said apparatus to each zone, flow control means mounted in each duct leading to each zone, actuator means connected for controlling the position of each of said flow control means, switch means for each zone, said switch means being of a delayed action type and having an operator to operate a switch after a predetermined time of energization, thermostat means in each zone for maintaining a predetermined temperature, a source of power, circuit means for each zone connecting said source to energize said actuator of said flow control means and said operator of said switch means upon a need for conditioned medium by said thermostat means, circuit means including said switch means of each zone being adapted to control the energization of said conditioning apparatus, electric feedback means mounted in each of said thermostat means, and means for changing the energization of each of said feedback means by said source to artifically effect said thermostats when said conditioning apparatus is operating to change the temperature maintained by said thermostats from said predetermined temperature whereby one of said thermostat means of the zone having the greatest conditioning load remains in control of said conditioning apparatus.

6. In a space temperature control system, a space bimetal operated switch device adapted to be responsive to space temperature, a heater thermally associated with said bimetal, a temperature changing device, a slow operating relay means for controlling said temperature changing device supplying temperature conditioned medium to the space, said relay means having an energization winding, a source of power, circuit means connecting said switch device, said heater and said energization winding to said source to operate said changing device upon a need for a change in temperature, said heater lowering said control point for "heat anticipation" purposes, second heater means thermally associated with said bimetal, and circuit means including said relay and said space bimetal switch device connecting said second heater means to said source when said relay means is energized.

7. In a zone temperature control system,
an air conditioning apparatus,
means providing a plurality of zones,
a plurality of ducts connecting said apparatus to said plurality of zones,
damper means mounted in each of said ducts leading to each zone,
a slow operated switch means for each zone, said switch means having an operator for operating said switch means after being energized a predetermined period of time,
temperature responsive switch means in each zone,
a source of power,
circuit means for each zone including said temperature responsive switch means connecting said source to energize said damper means and said operator of said zone upon a need for conditioned air in the space,
relay means adapted to control the energization of said conditioning apparatus,
circuit means connecting said slow operated switch means of each zone to independently control the energization of said relay means from said source,
feedback means mounted in each of said temperature responsive switch means,
means including said relay means for connecting each of said feedback means to said source to modify said temperature responsive means of each zone when the conditioning apparatus is energized.

8. In a space temperature control system, temperature responsive switch means responsive to space temperature, feedback means associated with said temperature responsive switch means, a temperature changing device, a slow operating relay means for controlling said temperature changing device for supplying temperature conditioned medium to the space, said relay means having an energization winding and at least one switch actuated thereby, a source of power, circuit means connecting said switch means and said energization winding to said source to operate said changing device upon a need for a change in temperature, and circuit means including said one switch and said switch means connecting said feedback means to said source when said relay means is energized.

9. In a temperature control system, a bimetal operated switch device, a first heater thermally associated with said bimetal, a temperature changing device, relay means for controlling said temperature changing device, said relay means having an energization winding, a source of power, a space thermostat having a heat anticipation heater for modifying a control point, circuit means connecting said thermostat, and said first heater in series to said source to operate said switch device depending upon the percent on time of said thermostat, circuit means including said switch device for connecting said energization winding to said source, and means for additionally modifying said control point when said relay is energized and said thermostat is calling for a temperature change.

10. In a zone temperature control ssytem,
an air conditioning apparatus,
means providing a plurality of zones,
a plurality of ducts connecting said apparatus to said plurality of zones,
damper means mounted in each of said ducts leading to each zone,
actuator means connected for controlling the position of each of said damper means,
a thermally actuated switch means for each zone, said switch means having an electric heater associated therewith to heat a thermal unit to close a switch,
temperature responsive switch means in each zone having a normal heat anticipation electric heater thermally associated therewith for modifying an operation of said temperature responsive switch means,
a source of power,
circuit means including said temperature responsive switch means of each zone for connecting said source to energize said actuator means and to control the energization of said anticipation electric heater of said zone when said temperature responsive switch means closes a circuit upon a need for conditioned air in the zone,
relay means adapted to control the energization of said conditioning apparatus,
circuit means connecting said switch of said thermally actuated switch means of each zone in parallel to control the energization of said relay means from said source,
a feedback heater mounted in thermal relation with each of said temperature responsive switch means, and
means including said relay means and said zone temperature responsive switch means of each zone to control the energization of each of said respective zone feedback heaters by said source to further modify each of said temperature responsive switch means when the conditioning apparatus is energized.

11. In a zone temperature control system,
an air conditioning apparatus,
means providing a plurality of zones,
a plurality of ducts connecting said apparatus to said plurality of zones,
damper means mounted in each of said ducts leading to each zone,
actuator means connected for controlling the position of each of said damper means,
a slow operating switch means for each zone, said switch means having an actuator associated therewith to operate said switch means to close a circuit,
temperature responsive switch means in each zone,
a source of power,
circuit means including said temperature responsive switch means of each zone for connecting said source to operate said actuator means when said temperature responsive switch means responds to a need for conditioned air in the zone,
relay means adapted to control the energization of said conditioning apparatus,
circuit means connecting said circuit of said slow operating switch means of each zone in parallel to control the energization of said relay means from said source,
a feedback means mounted in each of said temperature responsive switch means, and
means including said relay means to control the energization of each of said respective zone feedback means by said source to modify each of said temperature responsive switch means.

12. An improvement in a zone temperature control system having a plurality of zones connected by duct means to an air conditioning apparatus with individual temperature responsive means in each zone for controlling flow control means in the duct means for each respective zone and means controlled by any one of said temperature responsive means for controlling the operation of the air conditioning apparatus, the improvement comprising:
feedback means in each of said zone temperature responsive means for modifying a control point of each of said temperature responsive means when said air conditioning apparatus is in operation so the zone temperature responsive means of the zone having the greatest conditioning load has the primary control of said air conditioning apparatus.

13. In a zone temperature control system,
an air conditioning apparatus,
a plurality of zones in which the temperature of the air is to be selectively controlled, a plurality of conduct means connecting said apparatus to each of said zones,
flow control means in each of said conduct means leading to each zone,
temperature responsive means in each zone,
a first slow operating switch means for each zone, said switch means having an actuator associated therewith to operate said switch means to close a circuit,
a source of power,
circuit means including said temperature responsive means of each zone for connecting said actuator and said flow control means of the respective zone to said source of power,
circuit means including each of said circuits of said slow operating switch means for individually controlling the operation of said air conditioning apparatus,
a second slow operating means, and
circuit means including said second slow operating means and said zone temperature responsive means of all zones for causing said flow control means to provide a predetermined air flow to said zones when said zone temperature responsive means are satisfied.

14. In a zone temperature control system,
an air conditioning apparatus,
a plurality of zones in which the temperature of the air is to be selectively controlled,
a plurality of ducts connecting said apparatus to each of said zones,
damper means in each of said ducts,
temperature responsive switch means in each zone,
a slow operating switch means for each zone, said switch means having an actuator associated therewith to operate a switch,
a source of power,
circuit means including said temperature responsive switch means of each zone for connecting said actuator and said damper means of the respective zone to said source of power,
circuit means including each switch of said slow operating switch means for individually controlling the operating of said air conditioning apparatus,
a second slow operating switch means, and
circuit means including said second slow operating switch means and said zone temperature responsive switch means of all zones for causing said damper means of each zone to provide a predetermined flow to said zones when said zone temperature responsive switch means of all zones are satisfied.

15. In a zone temperature control system,
an air conditioning apparatus,
means providing a plurality of zones,
conduct means connecting said apparatus to each of said zones to provide for the flow of conditioned air to said zones,
flow control means for each conduct means,
temperature responsive means in each zone,
means connecting said temperature responsive means of each zone to control said conditioning apparatus when said zone needs conditioned air,
a source of power,
means including said temperature responsive means of each zone for connecting said source of power to said flow control means of each zone whereby upon the need of conditioned air to one of said zones said temperature responsive means can control the energization of said flow control means,
a slow operating means,
means connecting said slow operating means to each of said temperature responsive means and each of said flow control means whereby all of said flow control means are opened to provide full air flow to all zones when all of said temperature responsive means are satisfied, and
means for providing continuous circulation of air to all zones when all of said flow control means are opened.

16. In a zone temperature control system,
an air conditioning apparatus,
means providing a plurality of zones,
duct means connecting said apparatus to each of said zones to provide for the flow of conditioned air to said zones,
damper means for each duct means,
temperature responsive switch means in each zone,
a source of power,
means including said temperature responsive switch means of each zone for connecting said source of power to said damper means of each zone whereby upon the need of conditioned air to one of said zones said temperature responsive switch means can control the energization of said damper,
a time delay switch means, and
means connecting said delay switch means to each of said temperature responsive switch means and each of said damper means whereby all of said damper means are opened to provide a predetermined amount of air flow to all zones when all of said temperature responsive means are satisfied for a predetermined period of time.

17. An improvement in a zone temperature control system having a plurality of zones connected by duct means to an air conditioning apparatus with individual temperature responsive means in each zone controlling flow control means in the duct means for each respective zone wherein upon all temperature responsive means being satisfied the flow control means of each zone provides a maximum air flow from the conditioning apparatus to all zones, the improvement comprising:
means for delaying the operating of said flow control means upon all of the thermostats being satisfied to prevent the flow control means from moving to the maximum flow position for a predetermined period of time.

References Cited by the Examiner

UNITED STATES PATENTS

| | | | |
|---|---|---|---|
| 1,997,559 | 4/35 | Hajek | 236—68 X |
| 2,006,658 | 7/35 | Smulski | 236—68 |
| 2,156,082 | 4/39 | Crago | 236—68 |
| 2,286,296 | 6/42 | McGrath | 236—68 |
| 2,483,747 | 10/49 | Williams | 236—68 |
| 2,978,228 | 4/61 | Carlson | 236—68 X |

WILLIAM F. O'DEA, *Acting Primary Examiner.*
ALDEN D. STEWART, *Examiner.*